March 7, 1961 P. M. ENGLE 2,973,828
FILTER
Filed May 26, 1958

INVENTOR.
PAUL M. ENGLE
BY
ATTORNEY

United States Patent Office 2,973,828
Patented Mar. 7, 1961

2,973,828

FILTER

Paul M. Engle, Syracuse, N.Y., assignor to Cambridge Filter Manufacturing Corporation, a corporation of New York Filed May 26, 1958, Ser. No. 737,563

9 Claims. (Cl. 183—4)

This invention relates to gas filters and more particularly to filters having provision for adsorbing as well as filtering.

In filters of the type generally shown in Root #2,720,-937, issued Oct. 18, 1955, and in Baldwin application Serial No. 657,205, filed May 6, 1958, now Patent No. 2,884,091, issued April 28, 1959, there are shown filter constructions in which the filter medium is of extended area through the uses of a multiplicity of relatively closely spaced plaits, the spacing of which is maintained by corrugated separators. Such filters may be provided with filter media of the type disclosed in Stafford and Lee Patent #2,507,827, issued May 16, 1950, and are generally of the high efficiency type. In such filters, vapors, complex organic odors and the like may pass through the filter media. The present invention is directed to a construction in which such vapors are removed by adsorption or chemical reaction, and in which the corrugated spacers are provided with active material such as activated carbon, alumina salts, silver plating or the like whereby an extended surface area is exposed to the gases while awaiting passage through the filter media, or while collecting in the voids of the corrugated spacers beyond the filter media, preparatory to discharge from the filter unit into the discharge gas duct.

It is accordingly an object of the present invention to provide in a filter of the type described, an extended active adsorption or reactive surface exposed to the gases prior to and immediately following passage through the filter medium, whereby to selectively remove vapors and the like which normally and otherwise would pass through the filter medium.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
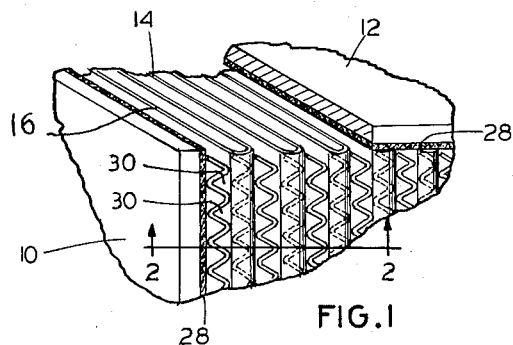
Figure 1 is a fragmentary perspective view, partly in section of a filter adapted to the invention.
Figure 2:
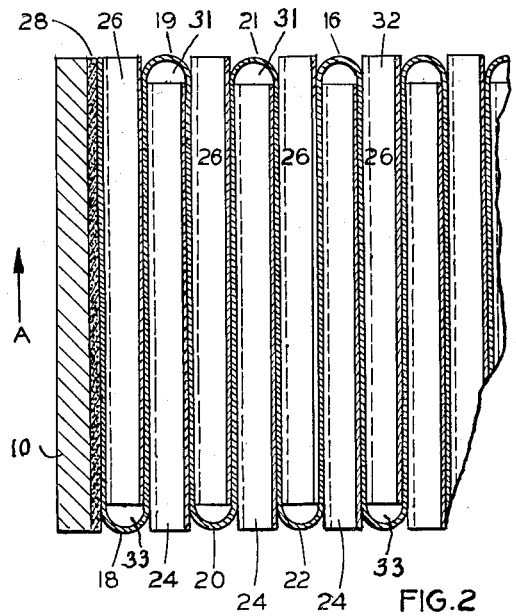
Figure 2 is a section taken on the lines 2—2 of Figure 1.
Figure 3:
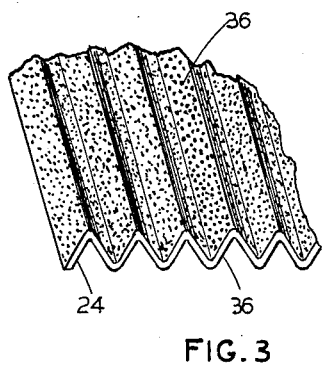
Figure 3 is a fragmentary perspective view of a separator.

Referring to the drawings, in Figure 1, there is shown a corner portion of a filter, comprising a rigid rectangular frame having sides 10 and 12 of heavy plywood or the like, in which is a filter core, generally indicated at 14. The filter core comprises a sheet 16 of filter material formed into a series of folds or plaits 18, 19, 20, 21, 22 etc. between which are disposed corrugated stiff thin spacers such as 24 and 26 the spacers being inserted into the folds, to maintain spacing. The core is sealed within the case by sealing compound 28 or fiber glass matting under compression, so as to preclude bypass. Assuming air flow is in the direction of arrow A, air or gas enters the triangular sectional voids 30 formed by the corrugated spacers 24 and extending into the filter from the upstream side of the filter, and the gas filters through the filter medium 16, leaving the filter through the similar triangular sectioned voids 32 in the spacers 26 extending into the filter from the downstream side of the filter. Air, or gas to be filtered, by reason of the extended area of the filter medium, moves at a gradually decelerating speed, on entry into each of the voids 30 where the corrugations are uniform as shown, as the gas progresses toward the dead ends 31 thereof, since the gas passes through the sections of the filter medium on either side of the separator, at a somewhat uniform rate through each unit of surface area thereof. In emerging, such air moves with increasing velocity from the dead end 33 of voids 32, as it progresses to the open end thereof, since air enters the voids 32 after passage through the filter medium over substantially the entire area thereof. Where the corrugations vary in depth, as in the Root patent, the velocity is substantially uniform over the length of each corrugation providing a similar effect.

The spacers 24 and 26 are coated, on each side thereof, with activated carbon 36 or other material, capable of absorbing some of the constituents in the gas, the removal of which is desired, but which by their vapor or other characteristic are not readily removed by the filter itself. The mere exposure of the gas, while awaiting passage through the filter, within the voids 30 exposes the gas to the activated carbon a sufficient time to actively remove such constituents.

If the separators on the outlet side are similarly treated, the gas in making a complete pass through the filter is uniformly exposed over a fixed period of time, since the gas which travels the full length of the void on the inlet side of the filter, is exposed a minimum of time to the activated carbon of the separator on the outlet side, while the gas that passes through the filter near the entrance to the separator voids on the inlet side, is exposed to a maximum travel through the separator void after passing through the filter, to provide a uniform exposure time.

In practice, the absorbing coating or surface on the separators may be activated carbon, silver plating, deliquescent salts, alumina, anhydrous aluminum oxide or other suitable materials. Activated carbon, for example, is effective in adsorbing complex organic odors, containing oxygen and nitrogen, whereas silver plating is effective in removing radioactive iodine and similar substances. Deliquescent salts, alumina, and anhydrous aluminum oxide are effective in removing the last traces of moisture. The various substances may be caused to adhere to the separator surface through suspension in resinous substances. In fact, the entire separator may be a corrugated carbon sheet or thin active metallic sheet material. Where the surface is coated with silver, the separators may be laminated in form, comprising a heavy paper core or other material and surfaces of silver leaf. Two or more substances may be applied to the separators over a pattern, or in a mixed fashion to render the same effective in respect to more than one type of substance.

While the filter media may contain mineral fibers of fine diameter as described in Stafford and Lee #2,507,-827, such media may be of glass fiber or mixtures of the two or other sheet media as desired. It will be appreciated that the surface area of the corrugated separators may be increased or decreased by varying the pitch of the corrugations or by graduating the depth as shown in Root, and the thickness or bed of material applied to the surface may be varied so that the life of the active material may be correlated to that of the filter media, for a given gas mixture, undergoing filtration, whereby uniform operation results during the entire life of the filter unit.

While a single form of the invention, with reference to various active materials and filter medium have been referred to, it will be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A gas filter comprising a frame, plaited filter media in porous sheet form and through which gases pass at a relatively slow rate disposed in said frame, void producing spacers for said plaits disposed in the upstream side and downstream side thereof defining spaces for gas to collect prior to and after passage through the media, said spacers having active absorbent surfaces for the treatment of gas awaiting passage through said filter medium.

2. A gas filter comprising a frame, plaited filter media in porous sheet form and through which gases pass at a relatively slow rate disposed in said frame, void producing spacers for said plaits disposed in the upstream side and downstream side thereof defining spaces for gas to collect prior to and after passage through the media, said spacers on the upstream side having active absorbent surfaces for the treatment of gases awaiting passage through said filter medium.

3. A gas filter comprising a frame, plaited filter media in porous sheet form and through which gases pass at a relatively slow rate disposed in said frame, corrugated spacers disposed in the upstream side and downstream side thereof defining spaces for gas to collect prior to and after passage through the media, the corrugations extending to the folds of the respective plaits, said spacers in the upstream side having activated adsorbent surfaces for the treatment of gases awaiting passage through said filter media.

4. A gas filter comprising a frame, plaited filter media in porous sheet form and through which gases pass at a relatively slow rate disposed in said frame, corrugated spacers disposed in the upstream side and downstream side thereof defining spaces for gas to collect prior to and after passage through the media, the corrugations extending to the folds of the respective plaits to provide passages leading to said media and away therefrom, said spacers in both the upstream and downstream side having activated adsorbent surfaces for the treatment of gases exposed thereto prior to passage through said filter media and while collecting within said passages immediately after passage through said media.

5. A filter according to claim 4 in which the spacers have surfaces of activated carbon.

6. A filter according to claim 4 in which the spacers comprise corrugated actuated carbon sheet.

7. A filter according to claim 4 in which the spacers have moisture adsorbent surfaces.

8. A filter according to claim 4 in which the spacers comprise a laminated structure comprising a fibrous core and silver leaf surfaces.

9. A filter according to claim 4 in which the spacers comprise a laminated structure comprising a supporting core sheet and active metallic surfaces.

References Cited in the file of this patent

UNITED STATES PATENTS

| | | |
|---|---|---|
| 1,210,375 | Decker | Dec. 26, 1916 |
| 2,038,071 | Wilhelm | Apr. 21, 1936 |
| 2,796,143 | Longenecker | June 18, 1957 |